US011586264B2

(12) United States Patent
Han (10) Patent No.: US 11,586,264 B2
(45) Date of Patent: Feb. 21, 2023

(54) ALLOCATION METHOD, SYSTEM AND DEVICE FOR POWER CONSUMPTION OF COMPLETE MACHINE BOX, AND READABLE STORAGE MEDIUM

(71) Applicant: INSPUR SUZHOU INTELLIGENT TECHNOLOGY CO., LTD, Jiangsu (CN)

(72) Inventor: Hongrui Han, Jiangsu (CN)

(73) Assignee: INSPUR SUZHOU INTELLIGENT TECHNOLOGY CO., LTD, Jiangsu (CN)

( * ) Notice: Subject to any disclaimer, the term of this patent is extended or adjusted under 35 U.S.C. 154(b) by 51 days.

(21) Appl. No.: 17/281,590

(22) PCT Filed: Sep. 29, 2019

(86) PCT No.: PCT/CN2019/108980
§ 371 (c)(1),
(2) Date: Mar. 31, 2021

(87) PCT Pub. No.: WO2020/258569
PCT Pub. Date: Dec. 30, 2020

(65) Prior Publication Data
US 2021/0365095 A1 Nov. 25, 2021

(30) Foreign Application Priority Data

Jun. 27, 2019 (CN) .......................... 201910568193.3

(51) Int. Cl.
*G06F 1/28* (2006.01)
*G06F 9/50* (2006.01)
(52) U.S. Cl.
CPC .............. *G06F 1/28* (2013.01); *G06F 9/5094* (2013.01)

(58) Field of Classification Search
CPC .................................. G06F 1/28; G06F 9/5094
See application file for complete search history.

(56) References Cited

U.S. PATENT DOCUMENTS 9,880,599 B1 * 1/2018 Allen-Ware .......... G06F 1/3228
2006/0177192 A1 * 8/2006 Jonnala ..................... G06F 1/28
385/147

(Continued)

FOREIGN PATENT DOCUMENTS

CN    102208986 A    10/2011
CN    102419718 A    4/2012

(Continued)

OTHER PUBLICATIONS

International Search Report for PCT/CN2019/108980 dated Mar. 26, 2020, ISA/CN.

(Continued)

*Primary Examiner* — Aurel Prifti
(74) *Attorney, Agent, or Firm* — Yue (Robert) Xu; Apex Attorneys at Law, LLP (57) ABSTRACT

Provided are an allocation method, system and device for power consumption of a complete machine box, and a readable storage medium. The method, applied to a CMC, includes: determining reserved total power consumption, based on rated power consumption of an integral chassis and preset power consumption of each node; allocating the preset power consumption to each node correspondingly; detecting, at a detection frequency, actual power consumption of each node; and re-allocating, for each node, the reserved total power consumption and the preset power consumption of the node, based on a rate of change in the actual power consumption of the node and/or a power consumption utilization ratio that is a ratio of the actual power consumption of the node to the preset power consumption of the node, thereby maximizing the effective (Continued)

utilization ratio of the integral chassis, reducing the unused power consumption, and reducing operating cost.

9 Claims, 3 Drawing Sheets

(56) References Cited

U.S. PATENT DOCUMENTS

| | | | | |
|---|---|---|---|---|
| 2010/0037077 A1* | 2/2010 | Kashyap | ............... | G06F 9/5094 |
| | | | | 713/330 |
| 2010/0070784 A1* | 3/2010 | Gupta | ..................... | H04L 43/04 |
| | | | | 713/320 |
| 2011/0113273 A1* | 5/2011 | Okitsu | .................... | G06F 1/206 |
| | | | | 713/320 |
| 2013/0174152 A1* | 7/2013 | Yu | ........................... | G06F 9/455 |
| | | | | 718/1 |
| 2013/0226362 A1* | 8/2013 | Jagadishprasad | ..... | G06F 1/3203 |
| | | | | 700/297 |
| 2013/0318371 A1* | 11/2013 | Hormuth | ............ | G06F 11/3062 |
| | | | | 713/320 |
| 2014/0245054 A1* | 8/2014 | Hamdi | ................... | H04L 43/08 |
| | | | | 713/340 |
| 2014/0298047 A1* | 10/2014 | Holler | .................... | G06F 1/329 |
| | | | | 713/300 |
| 2015/0362971 A1* | 12/2015 | Chadha | ................. | G06F 1/3234 |
| | | | | 713/300 |
| 2016/0202744 A1* | 7/2016 | Castro-Leon | ......... | G06F 9/5094 |
| | | | | 713/310 |
| 2016/0349812 A1* | 12/2016 | Goh | ..................... | G06F 11/3058 |
| 2017/0160781 A1* | 6/2017 | Piga | ...................... | G06F 1/3206 |
| 2017/0255494 A1 | 9/2017 | Bartfai-Walcott et al. | | |
| 2017/0329383 A1* | 11/2017 | Bailey | ....................... | G06F 1/28 |
| 2018/0144272 A1* | 5/2018 | Moroo | ................. | G06F 9/5094 |
| 2019/0041937 A1* | 2/2019 | Li | ...................... | G01R 21/1338 |
| 2020/0012334 A1* | 1/2020 | Bodireddy | ............ | G06F 1/3234 |
| 2020/0042068 A1* | 2/2020 | Rong | ................... | G06F 1/3203 |
| 2022/0113780 A1* | 4/2022 | York | ...................... | H04L 12/10 |

FOREIGN PATENT DOCUMENTS

| | | |
|---|---|---|
| CN | 102497275 A | 6/2012 |
| CN | 103389791 A | 11/2013 |
| CN | 107908479 A | 4/2018 |
| CN | 108874112 A | 11/2018 |

OTHER PUBLICATIONS

First Office Action dated Jun. 7, 2021 for Chinese patnet application No. 201910568193.3, English translation provided by Global Dossier.

* cited by examiner

ALLOCATION METHOD, SYSTEM AND DEVICE FOR POWER CONSUMPTION OF COMPLETE MACHINE BOX, AND READABLE STORAGE MEDIUM

This application is the national phase of International Application No. PCT/CN2019/108980, titled "ALLOCATION METHOD, SYSTEM AND DEVICE FOR POWER CONSUMPTION OF COMPLETE MACHINE BOX, AND READABLE STORAGE MEDIUM", filed on Sep. 29, 2019, which claims the priority to Chinese Patent Application No. 201910568193.3, titled "ALLOCATION METHOD, SYSTEM AND DEVICE FOR POWER CONSUMPTION OF INTEGRAL CHASSIS, AND READABLE STORAGE MEDIUM", filed with the China National Intellectual Property Administration (CNIPA) on Jun. 27, 2019, which is incorporated herein by reference in its entirety.

FIELD

The present disclosure relates to the field of energy consumption in a machine room, and in particular to an allocation method, system and device for power consumption of an integral chassis, and a readable storage medium.

BACKGROUND

With the centralization and clustering of modern machine rooms, the number of server nodes and cluster nodes increases rapidly, which inevitably leads to a rapid increase in power consumption. However, power reinforcement for the existing machine rooms is subject to various external factors and may not be able to follow up in time. As a result, when some new devices are updated, it is required to apply restrictions on power consumption of the devices.

Common restriction methods include: manually determining a power consumption limit of each node, in which power consumptions for the nodes are independent from each other, and the total power consumption does not exceed a limit; or setting power consumption of an integral chassis through a CMC (Chassis Management Controller) management module on the integral chassis, and the CMC evenly allocating the total power consumption to the nodes.

However, regardless of the manual setting or even allocation by CMC, business workload of the nodes is not consistent. At a busy node, power consumption may limit the processing speed and processing efficiency of the node, resulting in that the amount of business to be processed continues to rise; while at an idle node, a waste of power consumption may occur, resulting in that part of power consumption is unused and the total power consumption of the chassis cannot be fully used, thus wasting a large amount of power resources.

SUMMARY

In view of this, the present disclosure aims to provide an allocation method, system and device for power consumption of an integral chassis, and a readable storage medium. The specific solutions are as follows.

An allocation method for power consumption of an integral chassis, applied to a CMC, includes:
determining reserved total power consumption, based on rated power consumption of an integral chassis and preset power consumption of each node;
allocating the preset power consumption to each node correspondingly;
detecting, at a detection frequency, actual power consumption of each node; and
re-allocating, for each node, the reserved total power consumption and the preset power consumption of the node, based on a rate of change in the actual power consumption of the node and/or a power consumption utilization ratio that is a ratio of the actual power consumption of the node to the preset power consumption of the node.

In an embodiment, for each node, the preset power consumption of the node is determined based on a node level of the node.

In an embodiment, for any node, the step of re-allocating the reserved total power consumption and the preset power consumption of the node, based on a rate of change in the actual power consumption of the node and/or a power consumption utilization ratio that is a ratio of the actual power consumption of the node to the preset power consumption of the node, comprises:
determining a first power consumption for allocation based on an increase rate of the actual power consumption of the node and allocating the first power consumption for allocation from the reserved total power consumption to the preset power consumption of the node, when the increase rate of the actual power consumption of the node exceeds a first rate and/or when the power consumption utilization ratio of the node exceeds a first utilization ratio; and
determining a second power consumption for allocation based on a decrease rate of the actual power consumption of the node and allocating the second power consumption for allocation from the preset power consumption of the node to the reserved total power consumption, when the decrease rate of the actual power consumption of the node exceeds a second rate and/or when the power consumption utilization ratio of the node is lower than a second utilization ratio.

In an embodiment, the first utilization ratio is greater than or equal to the second utilization ratio.

In an embodiment, the rate of change in the actual power consumption of the node equals to a rate of change in the power consumption utilization ratio of the node.

In an embodiment, the allocation method further includes:
determining a node that meets a condition for recycling power consumption as a node with to-be-recycled power consumption and re-allocating the reserved total power consumption and the preset power consumption of the node with to-be-recycled power consumption, when the reserved total power consumption is equal to zero.

In an embodiment, the condition for recycling power consumption is that the power consumption utilization ratio of the node is lower than a third utilization ratio, and
the step of re-allocating the reserved total power consumption and the preset power consumption of the node with to-be-recycled power consumption comprises:
determining a third power consumption for allocation, and allocating the third power consumption for allocation from the preset power consumption of the node with to-be-recycled power consumption to the reserved total power consumption, such that a power consumption utilization ratio of the node with to-be-recycled power consumption is equal to or greater than a fourth utilization ratio.

In an embodiment, the allocation method further includes:
when the reserved total power consumption is less than zero, calculating, for each node, a difference between the preset power consumption of the node and the actual power consumption of the node to obtain a residual power consumption, and calculating a sum of residual power consumption of all nodes, to obtain a total residual power consumption;

when a sum of the reserved total power consumption and the total residual power consumption is greater than zero, allocating part of the residual power consumption of each node to the reserved total power consumption, based on an absolute value of a ratio of the reserved total power consumption to the total residual power consumption; and when the sum of the reserved total power consumption and the total residual power consumption is less than zero, allocating the rated power consumption of the integral chassis to the preset power consumption of each node, based on proportions of the actual power consumption among the nodes.

Correspondingly, an allocation system for power consumption of an integral chassis is provided according to the present disclosure. The allocation system is applied to a CMC and includes:

a reserved total power consumption determination module, configured to determine reserved total power consumption, based on rated power consumption of an integral chassis and preset power consumption of each node;

a first allocation module, configured to allocate the preset power consumption to each node correspondingly;

a power consumption detection module, configured to detect, at a detection frequency, actual power consumption of each node; and a second allocation module, configured to re-allocate, for each node, the reserved total power consumption and the preset power consumption of the node, based on a rate of change in the actual power consumption of the node and/or a power consumption utilization ratio that is a ratio of the actual power consumption of the node to the preset power consumption of the node.

Correspondingly, an allocation device for power consumption of an integral chassis is provided according to the present disclosure. The allocation device is applied to a CMC and includes:

a memory, configured to store a computer program; and a processor, configured to implement, when executing the computer program, steps of the allocation method for power consumption of the integral chassis described above.

Correspondingly, a readable storage medium is provided according to the present disclosure. The readable storage medium is applied to a CMC. The readable storage medium stores a computer program which, when executed by a processor, causes the processor to implement steps of the allocation method for power consumption of the integral chassis described above.

The present disclosure is applied to a case where the rated power consumption of an integral chassis is limited. In this case, the CMC automatically adjusts preset power consumption for each node, and re-adjusts the preset power consumption for each node based on a detected actual power consumption change of each node and a power consumption utilization ratio of each node. In this way, it is ensured that a node may be allocated with relatively large power consumption at busy time, so as to process business with better performance, and a node may release unused power consumption to the reserved total power consumption at idle time, so as to avoid occupying excessive power consumption and causing the processing efficiency of other nodes being limited. Thus, the present disclosure enables to maximize the effective utilization ratio of the integral chassis, reduce the unused power consumption, and reduce operating cost.

DETAILED DESCRIPTION OF THE EMBODIMENTS

The technical solutions in the present disclosure are clearly and completely described hereinafter in conjunction with the drawings of the present disclosure. It is apparent that the embodiments described herein are only a part rather than all of embodiments according to the present disclosure. Any other embodiments obtained by those skilled in the art based on the embodiments in the present disclosure without any creative efforts fall within the protection scope of the present disclosure.

Regardless of the manual setting or even allocation by CMC, business workload of the nodes is not consistent. At a busy node, power consumption may limit the processing speed and processing efficiency of the node, resulting in that the amount of business to be processed continues to rise; while at an idle node, a waste of power consumption may occur, resulting in that part of power consumption is unused and the total power consumption of the chassis cannot be fully used, thus wasting a large amount of power resources. In the present disclosure, the CMC automatically adjusts preset power consumption for each node, and re-adjusts the preset power consumption for each node based on a detected actual power consumption change of each node and a power consumption utilization ratio of each node, which avoids occupying excessive power consumption and causing the processing efficiency of other nodes being limited. Thus, the present disclosure enables to maximize the effective utilization ratio of the integral chassis, reduce the unused power consumption, and reduce operating cost.

Figure 1:
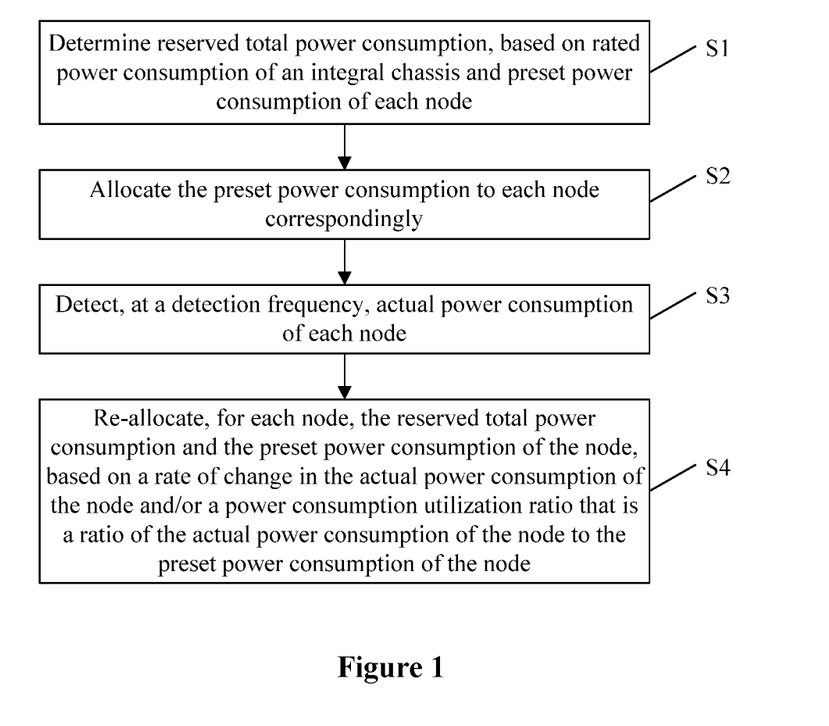
FIG. 1 is a flow chart of steps of an allocation method for power consumption of an integral chassis according to an embodiment of the present disclosure.

An allocation method for power consumption of an integral chassis is provided according to an embodiment of the present disclosure. The allocation method is applied to a CMC, and includes steps S1 to S4 as shown in FIG. 1.

In step S1, reserved total power consumption is determined based on rated power consumption of an integral chassis and preset power consumption of each node.

The reserved total power consumption is obtained by subtracting preset power consumption of all nodes from the rated power consumption of the integral chassis.

Generally, for each node, the preset power consumption corresponding to the node is determined based on a node level of the node. A node with a higher node level corresponds to larger preset power consumption.

In step S2, each node is allocated with preset power consumption corresponding to the node.

Figure 2:
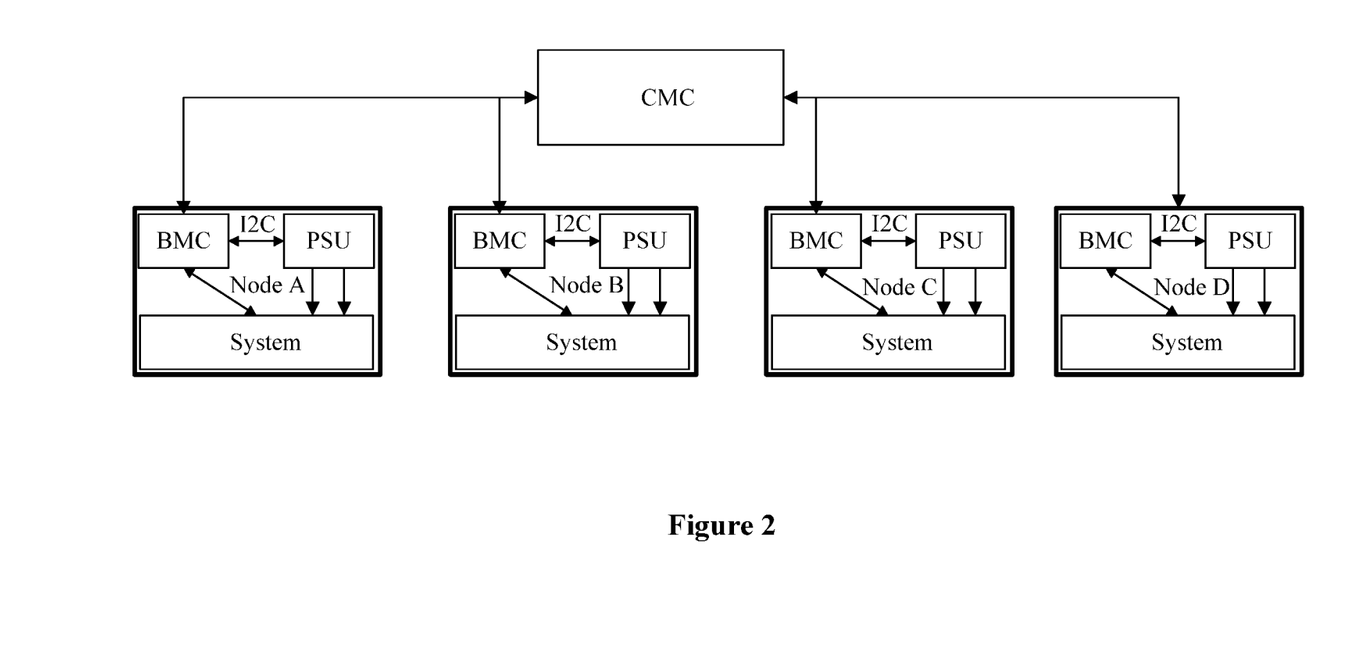
FIG. 2 is a structural topology diagram of internal devices of an integral chassis according to an embodiment of the present disclosure.

It is understood that, with reference to the structural topology diagram in FIG. 2, the step of allocating preset power consumption to each node by a CMC in the integral chassis actually refers to that, the CMC sends configuration information on preset power consumption to a BMC (Baseboard Management Controller) in each node, and the SYSTEM of each node determines a system operation strategy according to the configuration information on preset power consumption in the BMC.

In step S3, actual power consumption of each node is detected at a detection frequency.

It is understood that, the SYSTEM of each node is powered by a PSU (Power Supply Unit) of the node. Therefore, the power consumption of each node detected in step S3 is actually a total power consumption of all PSUs in each node. In each node, the BMC accumulates the power consumption of all the corresponding PSUs for query by the CMC. The CMC extracts real-time power consumption data from each BMC at a detection frequency, and the detection frequency may be set in the CMC by users.

In step S4, for each node, the reserved total power consumption and the preset power consumption of the node are re-allocated, based on a rate of change in an actual power consumption of the node and/or a power consumption utilization ratio that is a ratio of the actual power consumption of the node to the preset power consumption of the node.

Specifically, for any node, the step of re-allocating the reserved total power consumption and the preset power consumption of the node, based on a rate of change in the actual power consumption of the node and/or a power consumption utilization ratio that is a ratio of the actual power consumption of the node to the preset power consumption of the node, includes:

determining a first power consumption for allocation based on an increase rate of the actual power consumption of the node and allocating the first power consumption for allocation from the reserved total power consumption to the preset power consumption of the node, when the increase rate of the actual power consumption of the node exceeds a first rate and/or when the power consumption utilization ratio of the node exceeds a first utilization ratio; and determining a second power consumption for allocation based on a decrease rate of the actual power consumption of the node and allocating the second power consumption for allocation from the preset power consumption of the node to the reserved total power consumption, when the decrease rate of the actual power consumption of the node exceeds a second rate and/or when the power consumption utilization ratio of the node is lower than a second utilization ratio.

It is understood that, the rate of change in the actual power consumption of a node may refer to an amount of change in the actual power consumption of the node obtained by two detection operations, or refer to a rate of change in the power consumption utilization ratio.

Taking the increase of the actual power consumption of a node as an example, it is supposed that the first utilization ratio of the node is set to 90%. When the power consumption utilization ratio, that is a ratio of the actual power consumption of the node to the preset power consumption of the node, exceeds 90%, it is to analyze, based on historical detection data, whether an increase rate of the current actual power consumption exceeds a first rate. If it is determined that the increase rate of the current actual power consumption exceeds the first rate, a first power consumption for allocation is predicted based on the increase rate. When the reserved total power consumption is greater than or equal to the first power consumption for allocation, the first power consumption for allocation is allocated from the reserved total power consumption to the preset power consumption of the node.

A case where the actual power consumption of a node decreases is similar to the above. Generally, the second utilization ratio may be set to 50%. A second power consumption for allocation is determined based on the decrease rate. With the second power consumption for allocation being allocated from the preset power consumption of the node to the reserved total power consumption, it may be realized the power consumption utilization ratio of the node, that is the actual power consumption to the preset power consumption of the node, to be higher. Generally, the power consumption utilization ratio needs to be above 80%.

It is understood that, the first rate, the second rate, the first utilization ratio, the second utilization ratio, the first power consumption for allocation and the second power consumption for allocation mentioned above are all positive values. The specific characteristic values related to the power consumption utilization ratio, such as the first utilization ratio and the second utilization ratio, have no certain limitations herein, as long as the values meet requirements for corresponding services. Generally, the first utilization ratio is greater than or equal to the second utilization ratio.

The allocation method for power consumption of an integral chassis is provided according to the present disclosure. The allocation method is applied to a CMC and includes: determining reserved total power consumption, based on rated power consumption of an integral chassis and preset power consumption of each node; allocating the preset power consumption for each node; detecting, at a detection frequency, actual power consumption of each node; and re-allocating, for each node, the reserved total power consumption and the preset power consumption of the node, based on a rate of change in the actual power consumption of the node and/or a power consumption utilization ratio that is a ratio of the actual power consumption of the node to the preset power consumption of the node. The present disclosure is applied to a case where the rated power consumption of an integral chassis is limited. In this case, the CMC automatically adjusts preset power consumption for each node, and re-adjusts the preset power consumption for each node based on a detected actual power consumption change of each node and a power consumption utilization ratio of each node. In this way, it is ensured that a node may be allocated with relatively large power consumption at busy time, so as to process business with better performance, and a node may release unused power consumption to the reserved total power consumption at idle time, so as to avoid occupying excessive power consumption and causing the processing efficiency of other nodes being limited. Thus, the present disclosure enables to maximize the effective utilization ratio of the integral chassis, reduce the unused power consumption, and reduce operating cost.

An allocation method for power consumption of an integral chassis is further provided according to an embodiment of the present disclosure. Compared with the above embodiment, the technical solution is further illustrated and optimized in the present embodiment. Specifically, the allocation method further includes:

when the reserved total power consumption is equal to zero, determining a node that meets a condition for recycling power consumption as a node with to-be-recycled power consumption, and re-allocating the reserved total power consumption and the preset power consumption of the node with to-be-recycled power consumption.

Specifically, the condition for recycling power consumption is that the power consumption utilization ratio of the node is lower than a third utilization ratio.

The re-allocating the reserved total power consumption and the preset power consumption of a node with to-be-recycled power consumption includes:

determining a third power consumption for allocation and allocating the third power consumption for allocation from the preset power consumption of the node with to-be-recycled power consumption to the reserved total power consumption, such that the power consumption utilization ratio of the node with to-be-recycled power consumption is equal to or greater than a fourth utilization ratio.

For example, the third utilization ratio and the fourth utilization ratio are determined as 80% and 90%. Then, a node with a power consumption utilization ratio lower than 80% is determined as the node with to-be-recycled power consumption, and the third power consumption for allocation is allocated from the preset power consumption of the node to the reserved total power consumption. For example, for a node with a power consumption utilization ratio equal to 75%, part of power consumption of the node is recycled to the reserved total power consumption, such that the power consumption utilization ratio of the node exceeds 90%.

It is understood that, a node level may be further considered in the process of recycling power consumption. For example, a node with a lower node level corresponds to a higher third utilization ratio and is more likely to be determined as the node with to-be-recycled power consumption, whose unused preset power consumption will be recycled by the CMC to the reserved total power consumption.

If the reserved total power consumption is equal to zero and the power consumption utilization ratio of each node is greater than or equal to the fourth utilization ratio, the re-allocating of power consumption is no longer performed, and the SYSTEM of each node adjusts its electricity strategy based on the preset power consumption.

Furthermore, the rated power consumption of the integral chassis in the CMC according to the embodiment may be changed. When a user reduces the previous rated power consumption of the integral chassis, it is required to adjust the preset power consumption of nodes inside the integral chassis and the reserved total power consumption accordingly. If the reserved total power consumption at this time is greater than or equal to the change amount of the rated power consumption of the integral chassis, a relative power consumption is directly reduced from the reserved total power consumption. If the reserved total power consumption is less than the change amount of the rated power consumption of the integral chassis, a negative value will be obtained by subtracting the change amount of the rated power consumption from the reserved total power consumption.

Based on the above, the allocation method further includes:

when the reserved total power consumption is less than zero, calculating, for each node, a difference between the preset power consumption of the node and the actual power consumption of the node to obtain a residual power consumption, and calculating a sum of residual power consumption of all nodes, to obtain a total residual power consumption;

when a sum of the reserved total power consumption and the total residual power consumption is greater than zero, allocating part of the residual power consumption of each node to the reserved total power consumption, based on an absolute value of a ratio of the reserved total power consumption to the total residual power consumption; and when the sum of the reserved total power consumption and the total residual power consumption is less than zero, allocating the rated power consumption of the integral chassis to the preset power consumption of each node, based on proportions of the actual power consumption among the nodes.

For example, an integral chassis previously operates with a rated power consumption of 2000 W, and the rated power consumption was later reduced to 1500 W with a change amount of 500 W. In this case, it is determined whether the current reserved total power consumption is greater than or equal to 500 W. If the current reserved total power consumption is greater than or equal to 500 W, it is to subtract 500 W from the reserved total power consumption. If the current reserved total power consumption is less than 500 W, for example, the reserved total power consumption is −300 W after subtracting 500 W, a difference of the preset power consumption and the actual power consumption is calculated for each node inside the integral chassis to obtain residual power consumption of the node, and residual power consumption of all nodes are summed up to obtain a total residual power consumption.

Assuming that the total residual power consumption is 400, it indicates that the sum of the total residual power consumption and the reserved total power consumption is greater than zero. In this case, based on the absolute value of a ratio of the reserved total power consumption to the total residual power consumption, that is, 3:4, three-fourths of the residual power of each node is allocated to the reserved total power consumption to compensate for the lack in the reserved total power consumption. Or, assuming that the total residual power consumption is 200, it indicates that the sum of the total residual power consumption and the total reserved power consumption is negative. In this case, the current rated power consumption of 1500 W is allocated to the preset power consumption of each node, directly based on the proportions of the actual power consumption among the nodes at the current time. At this time, the preset total power consumption is equal to zero, and the SYSTEM of each node determines a corresponding electricity strategy based on the preset power consumption of the node.

Apparently, the nodes may be determined, based on node levels, as having different priority in terms of allocation of power consumption, so that nodes with higher node levels are more likely to obtain preset power consumption, and their preset power consumption is less likely to be recycled to the reserved total power consumption.

It is understood that if the rated power consumption of the integral chassis in the embodiment is changed, for example, the previous rated power consumption of the integral chassis is increased by a user, the increased part of the rated power is directly added to the reserved total power consumption.

According to the embodiment, the CMC is able to dynamically adjust the actual power consumption of nodes inside the integral chassis based on the amount of services of the nodes. When a node has less service, power consumption of the node may be automatically reduced by means of frequency reduction or the like, which effectively reduces unnecessary power consumption such as heat and thus improves node efficiency; and when services at the node increases, power allocation may be added in time, so as to improve service processing capability of the node and thus improve node performance.

Figure 3:
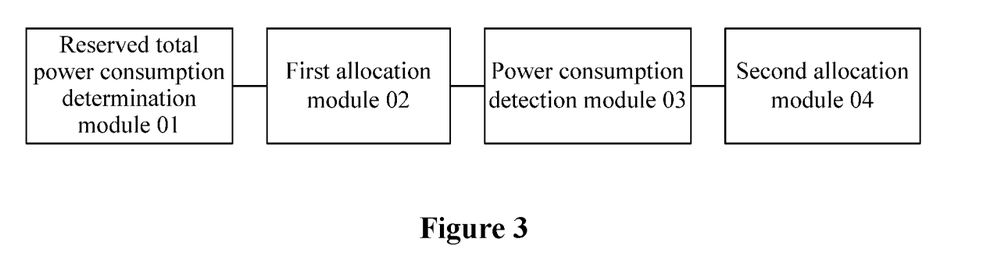
FIG. 3 is a structural distribution diagram of an allocation system for power consumption of an integral chassis according to an embodiment of the present disclosure.

In addition, an allocation system for power consumption of an integral chassis is disclosed according to an embodiment of the present disclosure. The allocation system is applied to a CMC. As shown in FIG. 3, the allocation system includes:

a reserved total power consumption determination module 01, configured to determine reserved total power consumption based on rated power consumption of an integral chassis and preset power consumption of each node;

a first allocation module 02, configured to allocate the preset power consumption to each node correspondingly;

a power consumption detection module 03, configured to detect, at a detection frequency, actual power consumption of each node; and a second allocation module 04, configured to re-allocate, for each node, the reserved total power consumption and the preset power consumption of the node, based on a rate of change in the actual power consumption of the node and/or a power consumption utilization ratio that is a ratio of the actual power consumption of the node to the preset power consumption of the node.

The embodiments of the present disclosure are applied to a case where the rated power consumption of an integral chassis is limited. In this case, the CMC automatically adjusts preset power consumption for each node, and re-adjusts the preset power consumption for each node based on a detected actual power consumption change of each node and a power consumption utilization ratio of each node. In this way, it is ensured that a node may be allocated with relatively large power consumption at busy time, so as to process business with better performance, and a node may release unused power consumption to the reserved total power consumption at idle time, so as to avoid occupying excessive power and causing the processing efficiency of other nodes being limited. Thus, the present disclosure enables to maximize the effective utilization ratio of the integral chassis, reduce the unused power consumption, and reduce operating cost.

In some embodiments, for each node, the preset power consumption corresponding to the node is determined based on a node level of the node.

In some embodiments, the second allocation module 04, in re-allocating, for each node, the reserved total power consumption and the preset power consumption of the node, based on a rate of change in the actual power consumption of the node and/or a power consumption utilization ratio that is a ratio of the actual power consumption of the node to the preset power consumption of the node, is configured to:

determine a first power consumption for allocation based on an increase rate of the actual power consumption of the node and allocate the first power consumption for allocation from the reserved total power consumption to the preset power consumption of the node, when the increase rate of the actual power consumption of the node exceeds a first rate and/or when the power consumption utilization ratio of the node exceeds a first utilization ratio; and determine a second power consumption for allocation based on a decrease rate of the actual power consumption of the node and allocate the second power consumption for allocation from the preset power consumption of the node to the reserved total power consumption, when the decrease rate of the actual power consumption of the node exceeds a second rate and/or when the power consumption utilization ratio of the node is lower than a second utilization ratio.

In some embodiments, the first utilization ratio is greater than or equal to the second utilization ratio.

In some embodiments, the rate of change in the actual power consumption of the node refers to a rate of change in the power consumption utilization ratio.

In some embodiments, the allocation system for power consumption of an integral chassis further includes a third allocation module, configured to: when the reserved total power consumption is equal to zero, determine a node that meets a condition for recycling power consumption as a node with to-be-recycled power consumption, and re-allocate the reserved total power consumption and the preset power consumption of the node with to-be-recycled power consumption.

In some embodiments, the condition for recycling power consumption refers to that the power consumption utilization ratio of a node is lower than a third utilization ratio.

The third allocation module, in re-allocating the reserved total power consumption and the preset power consumption of a node with to-be-recycled power consumption, is configured to:

determine a third power consumption for allocation and allocate the third power consumption for allocation from the preset power consumption of the node with to-be-recycled power consumption to the reserved total power consumption, such that the power consumption utilization ratio of the node with to-be-recycled power consumption is equal to or greater than a fourth utilization ratio.

In some embodiments, the allocation system for power consumption of an integral chassis further includes a fourth allocation module, configured to:

when the reserved total power consumption is less than zero, calculate, for each node, a difference between the preset power consumption of the node and the actual power consumption of the node to obtain a residual power consumption, and calculate a sum of residual power consumption of all nodes, to obtain a total residual power consumption;

when a sum of the reserved total power consumption and the total residual power consumption is greater than zero, allocate part of the residual power consumption of each node to the reserved total power consumption, based on an absolute value of a ratio of the reserved total power consumption to the total residual power consumption; and when the sum of the reserved total power consumption and the total residual power consumption is less than zero, allocate the rated power consumption of the integral chassis to the preset power consumption of each node, based on proportions of the actual power consumption among the nodes.

Figure 4:
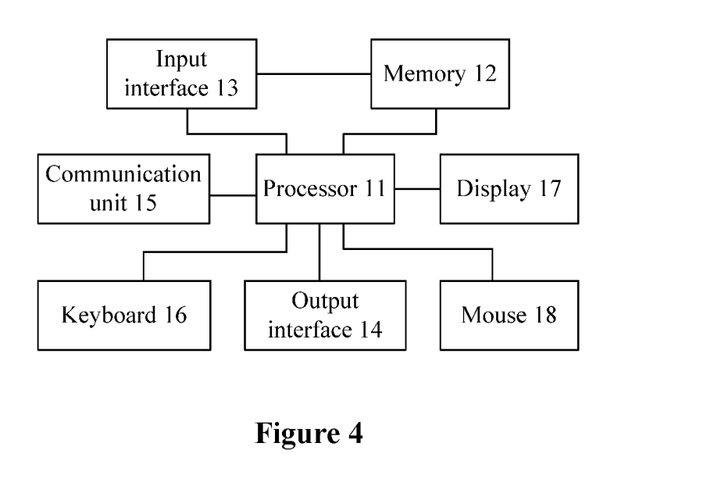
FIG. 4 is a structural distribution diagram of an allocation device for power consumption of an integral chassis according to an embodiment of the present disclosure.

An allocation device for power consumption of an integral chassis is further provided according to an embodiment of the present disclosure. The allocation device is applied to CMC. As shown in FIG. 4, the allocation device includes a processor 11 and a memory 12. The processor 11 is configured to implement, when executing a computer program stored in the memory 12, the following steps:

determining reserved total power consumption, based on rated power consumption of an integral chassis and preset power consumption of each node;

allocating the preset power consumption to each node correspondingly;

detecting, at a detection frequency, actual power consumption of each node; and re-allocating, for each node, the reserved total power consumption and the preset power consumption of the node, based on a rate of change in the actual power consumption of the node and/or a power consumption utilization ratio that is a ratio of the actual power consumption of the node to the preset power consumption of the node.

The embodiments of the present disclosure are applied to a case where the rated power consumption of an integral chassis is limited. In this case, the CMC automatically adjusts preset power consumption for each node, and re-adjusts the preset power consumption for each node based on a detected actual power consumption change of each node and a power consumption utilization ratio of each node. In this way, it is ensured that a node may be allocated with relatively large power consumption at busy time, so as to process business with better performance, and a node may release unused power consumption to the reserved total power consumption at idle time, so as to avoid occupying excessive power consumption and causing the processing efficiency of other nodes being limited. Thus, the present disclosure enables to maximize the effective utilization ratio of the integral chassis, reduce the unused power consumption, and reduce operating cost.

In some embodiments, for each node, the preset power consumption corresponding to the node is determined based on a node level of the node.

In some embodiments, the processor 11 is configured to implement, when executing a computer sub-program stored in the memory 12, the following steps:

determining a first power consumption for allocation based on an increase rate of the actual power consumption of the node and allocating the first power consumption for allocation from the reserved total power consumption to the preset power consumption of the node, when the increase rate of the actual power consumption of the node exceeds a first rate and/or when the power consumption utilization ratio of the node exceeds a first utilization ratio; and determining a second power consumption for allocation based on a decrease rate of the actual power consumption of the node and allocating the second power consumption for allocation from the preset power consumption of the node to the reserved total power consumption, when the decrease rate of the actual power consumption of the node exceeds a second rate and/or when the power consumption utilization ratio of the node is lower than a second utilization ratio.

In some embodiments, the first utilization ratio is greater than or equal to the second utilization ratio.

In some embodiments, the rate of change in the actual power consumption of the node refers to a rate of change in the power consumption utilization ratio of the node.

In some embodiments, the processor 11 is further configured to implement, when executing the computer sub-program stored in the memory 12, the following steps:

when the reserved total power consumption is equal to zero, determining a node that meets a condition for recycling power consumption as a node with to-be-recycled power consumption, and re-allocating the reserved total power consumption and the preset power consumption of the node with to-be-recycled power consumption.

In some embodiments, the condition for recycling power consumption refers to that the power consumption utilization ratio of a node is lower than a third utilization ratio.

The re-allocating the reserved total power consumption and the preset power consumption of a node with to-be-recycled power consumption includes:

determining a third power consumption for allocation and allocating the third power consumption for allocation from the preset power consumption of the node with to-be-recycled power consumption to the reserved total power consumption, such that the power consumption utilization ratio of the node with to-be-recycled power consumption is equal to or greater than a fourth utilization ratio.

In some embodiments, the processor 11 is further configured to implement, when executing the computer sub-program stored in the memory 12, the following steps:

when the reserved total power consumption is less than zero, calculating, for each node, a difference between the preset power consumption of the node and the actual power consumption of the node to obtain a residual power consumption, and calculating a sum of residual power consumption of all nodes, to obtain a total residual power consumption;

when a sum of the reserved total power consumption and the total residual power consumption is greater than zero, allocating part of the residual power consumption of each node to the reserved total power consumption, based on an absolute value of a ratio of the reserved total power consumption to the total residual power consumption; and when the sum of the reserved total power consumption and the total residual power consumption is less than zero, allocating the rated power consumption of the integral chassis to the preset power consumption of each node, based on proportions of the actual power consumption among the nodes.

In an embodiment, the allocation device for power consumption of an integral chassis according to an embodiment may further include: an input interface 13, an output interface 14, a communication unit 15, a keyboard 16, a display 17 and a mouse 18.

The input interface 13 is configured to obtain computer programs imported from outside, store the obtained computer programs in the memory 12, obtain various instructions and parameters transmitted by an external terminal device, such as preset power consumption and a detection frequency, obtain actual power consumption transmitted through the BMC of each node, and transmit the obtained contents to the processor 11, such that the processor 11 may perform some processing through the above instructions and parameters. In the embodiment, the input interface 13 may include, but is not limited to: a USB interface, a serial interface, a voice input interface, a LAN interface, an I2C interface, a hard disk reading interface, and the like.

The output interface 14 is configured to output data generated by the processor 11 to a terminal device connected with the output interface 14, such that other terminal device connected with the output interface 24 may obtain the data generated by the processor 11. For example, information on the pre-allocated preset power consumption may be sent to the corresponding node. In the embodiment, the output interface 14 may include, but is not limited to: a LAN interface, an I2C interface, a USB interface, a serial interface, and the like.

The communication unit 15 is configured to establish a remote communication connection between the allocation device and an external device such as a server or a client, so that the external device can check state information inside the allocation device and send parameter commands to the allocation device. In the embodiment, the communication unit 15 may include, but is not limited to: a remote communication unit based on wireless communication technology or wired communication technology.

The keyboard 16 is configured to obtain various parameters or instructions inputted from a user by tapping a keycap in real time.

The display 17 is configured to display related information in real time during allocation of power consumption, such that the user may be informed of the current allocation of power consumption of the integral chassis.

The mouse 18 is configured to assist the user in inputting data and simplify the user's operation.

Furthermore, a computer readable storage medium is further provided according to an embodiment of the present disclosure. The computer readable storage medium herein includes a Random Access Memory (RAM), a memory, a Read-Only Memory (ROM), an electrically programmable ROM, an electrically erasable programmable ROM, a register, a hard disk, a removable hard disk, a CD-ROM or any other form of storage medium known in the art. The computer readable storage medium stores a computer program. When the computer program is executed by a processor, the following steps may be implemented:

determining reserved total power consumption, based on rated power consumption of an integral chassis and preset power consumption of each node;

allocating the preset power consumption to each node correspondingly;

detecting, at a detection frequency, actual power consumption of each node; and re-allocating, for each node, the reserved total power consumption and the preset power consumption of the node, based on a rate of change in the actual power consumption of the node and/or a power consumption utilization ratio that is a ratio of the actual power consumption of the node to the preset power consumption of the node.

The embodiments of the present disclosure are applied to a case where the rated power consumption of an integral chassis is limited. In this case, the CMC automatically adjusts preset power consumption for each node, and re-adjusts the preset power consumption for each node based on a detected actual power consumption change of each node and a power consumption utilization ratio of each node. In this way, it is ensured that a node may be allocated with relatively large power consumption at busy time, so as to process business with better performance, and a node may release unused power consumption to the reserved total power consumption at idle time, so as to avoid occupying excessive power and causing the processing efficiency of other nodes being limited. Thus, the present disclosure enables to maximize the effective utilization ratio of the integral chassis, reduce the unused power consumption, and reduce operating cost.

In some embodiments, for each node, the preset power consumption corresponding to the node is determined based on a node level of the node.

In some embodiments, when a computer sub-program stored in the computer readable storage medium is executed by the processor, the following steps may be implemented:

determining a first power consumption for allocation based on an increase rate of the actual power consumption of the node and allocating the first power consumption for allocation from the reserved total power consumption to the preset power consumption of the node, when the increase rate of the actual power consumption of the node exceeds a first rate and/or when the power consumption utilization ratio of the node exceeds a first utilization ratio; and determining a second power consumption for allocation based on a decrease rate of the actual power consumption of the node and allocating the second power consumption for allocation from the preset power consumption of the node to the reserved total power consumption, when the decrease rate of the actual power consumption of the node exceeds a second rate and/or when the power consumption utilization ratio of the node is lower than a second utilization ratio.

In some embodiments, the first utilization ratio is greater than or equal to the second utilization ratio.

In some embodiments, the rate of change in the actual power consumption of the node refers to a rate of change in the power consumption utilization ratio of the node.

In some embodiments, when the computer sub-program stored in the computer readable storage medium is executed by the processor, the following steps may be implemented:

when the reserved total power consumption is equal to zero, determining a node that meets a condition for recycling power consumption as a node with to-be-recycled power consumption, and re-allocating the reserved total power consumption and the preset power consumption of the node with to-be-recycled power consumption.

In some embodiments, the condition for recycling power consumption refers to that the power consumption utilization ratio of a node is lower than a third utilization ratio.

The re-allocating the reserved total power consumption and the preset power consumption of a node with to-be-recycled power consumption includes:

determining a third power consumption for allocation and allocating the third power consumption for allocation from the preset power consumption of the node with to-be-recycled power consumption to the reserved total power consumption, such that the power consumption utilization ratio of the node with to-be-recycled power consumption is equal to or greater than a fourth utilization ratio.

In some embodiments, when the computer sub-program stored in the computer readable storage medium is executed by the processor, the following steps may be implemented:

when the reserved total power consumption is less than zero, calculating, for each node, a difference between the preset power consumption of the node and the actual power consumption of the node to obtain a residual power consumption, and calculating a sum of residual power consumption of all nodes, to obtain a total residual power consumption;

when a sum of the reserved total power consumption and the total residual power consumption is greater than zero, allocating part of the residual power consumption of each node to the reserved total power consumption, based on an absolute value of a ratio of the reserved total power consumption to the total residual power consumption; and when the sum of the reserved total power consumption and the total residual power consumption is less than zero, allocating the rated power consumption of the integral chassis to the preset power consumption of each node, based on proportions of the actual power consumption among the nodes.

It should be noted that the parameters a, b, c, d, e, f, g, j, k, m, p, and q mentioned in the present disclosure are simply for the convenience of explanation, and different letters may represent the same or different parameters.

Similarly, the angles $\alpha$, $\beta$, $\lambda$, $\theta$, $\gamma$, $\delta$, and $\eta$ mentioned in the present disclosure are simply for convenience of explanation, and the symbols themselves do not have any meaning.

It should be noted that, for ease of description, the foregoing method embodiments are described as combinations of a series of actions. However, those skilled in the art should appreciate that the present disclosure is not limited to the order of the described actions, because some of the steps may be performed in another order or simultaneously according to the present disclosure. Moreover, those skilled in the art should understand that embodiments described herein are preferred embodiments, and actions and modules in the embodiments are not necessarily required for the present disclosure.

Furthermore, it should be noted that, those skilled in the art may understand that some or all of the steps in the various methods according to the above embodiments may be implemented by a program instructing relevant hardware, where the program may be stored in a computer readable storage unit. In the embodiments according to the present disclosure, the storage unit may include a ROM, a RAM, a magnetic disk, or the like.

In this specification, terms such as "include", "comprise" or any other variants are intended to be non-exclusive. Therefore, a process, method, article or device including a series of elements includes not only the elements but also other elements that are not enumerated, or also include the elements inherent for the process, method, article or device. Unless expressively limited otherwise, the statement "comprising (including) a/an . . . " does not exclude a case where a process, method, article or device that includes the defined element further includes additional identical elements.

The embodiments in the present disclosure are described in a progressive manner, each of which mainly focuses on describing its differences from other embodiments, and references may be made among these embodiments with respect to the same or similar parts.

Based on the above description of the disclosed embodiments, those skilled in the art may implement or use the present disclosure. Many modifications to these embodiments are apparent for those skilled in the art. The general principles defined herein may be applied to other embodiments without departing from the spirit or scope of the present disclosure. Therefore, the present disclosure is not limited to the embodiments illustrated herein, but is to conform to the widest scope accordance with the principles and novel features disclosed herein.

The invention claimed is:

1. An allocation method for power consumption of an integral chassis, wherein the allocation method is applied to a chassis management controller (CMC) and comprises:
    determining reserved total power consumption, based on rated power consumption of an integral chassis and preset power consumption of each node;
    allocating the preset power consumption to each node correspondingly;
    detecting, at a detection frequency, actual power consumption of each node;
    re-allocating, for each node, the reserved total power consumption and the preset power consumption of the node, based on a rate of change in the actual power consumption of the node and/or a power consumption utilization ratio that is a ratio of the actual power consumption of the node to the preset power consumption of the node; and
    determining a node that meets a condition for recycling power consumption as a node with to-be-recycled power consumption and re-allocating the reserved total power consumption and the preset power consumption of the node with to-be-recycled power consumption, when the reserved total power consumption is equal to zero, wherein the condition for recycling power consumption is that the power consumption utilization ratio of the node is lower than a third utilization ratio,
    wherein the step of re-allocating the reserved total power consumption and the preset power consumption of the node with to-be-recycled power consumption comprises:
    determining a third power consumption for allocation, and allocating the third power consumption for allocation from the preset power consumption of the node with to-be-recycled power consumption to the reserved total power consumption, such that a power consumption utilization ratio of the node with to-be-recycled power consumption is equal to or greater than a fourth utilization ratio.

2. The allocation method according to claim 1, wherein for each node, the preset power consumption of the node is determined based on a node level of the node.

3. The allocation method according to claim 1, wherein, for any node, the step of re-allocating the reserved total power consumption and the preset power consumption of the node, based on a rate of change in the actual power consumption of the node and/or a power consumption utilization ratio that is a ratio of the actual power consumption of the node to the preset power consumption of the node, comprises:
    determining a first power consumption for allocation based on an increase rate of the actual power consumption of the node and allocating the first power consumption for allocation from the reserved total power consumption to the preset power consumption of the node, when the increase rate of the actual power consumption of the node exceeds a first rate and/or when the power consumption utilization ratio of the node exceeds a first utilization ratio; and
    determining a second power consumption for allocation based on a decrease rate of the actual power consumption of the node and allocating the second power consumption for allocation from the preset power consumption of the node to the reserved total power consumption, when the decrease rate of the actual power consumption of the node exceeds a second rate and/or when the power consumption utilization ratio of the node is lower than a second utilization ratio.

4. The allocation method according to claim 3, wherein the first utilization ratio is greater than or equal to the second utilization ratio.

5. The allocation method according to claim 4, wherein the rate of change in the actual power consumption of the node equals to a rate of change in the power consumption utilization ratio of the node.

6. The allocation method according to claim 1, further comprising:
    when the reserved total power consumption is less than zero, calculating, for each node, a difference between the preset power consumption of the node and the actual power consumption of the node to obtain a residual power consumption, and calculating a sum of residual power consumption of all nodes, to obtain a total residual power consumption;
    when a sum of the reserved total power consumption and the total residual power consumption is greater than zero, allocating part of the residual power consumption of each node to the reserved total power consumption, based on an absolute value of a ratio of the reserved total power consumption to the total residual power consumption; and
    when the sum of the reserved total power consumption and the total residual power consumption is less than zero, allocating the rated power consumption of the integral chassis to the preset power consumption of each node, based on proportions of the actual power consumption among the nodes.

7. An allocation system for power consumption of an integral chassis, wherein the allocation system is applied to a chassis management controller (CMC) and comprises:
    a processor; and
    a non-transitory memory storing a computer program, wherein the processor, when executing the computer program, is configured to:

determine reserved total power consumption, based on rated power consumption of an integral chassis and preset power consumption of each node;

allocate the preset power consumption to each node correspondingly;

detect, at a detection frequency, actual power consumption of each node;

re-allocate, for each node, the reserved total power consumption and the preset power consumption of the node, based on a rate of change in the actual power consumption of the node and/or a power consumption utilization ratio that is a ratio of the actual power consumption of the node to the preset power consumption of the node; and determine a node that meets a condition for recycling power consumption as a node with to-be-recycled power consumption and re-allocate the reserved total power consumption and the preset power consumption of the node with to-be-recycled power consumption, when the reserved total power consumption is equal to zero, wherein the condition for recycling power consumption is that the power consumption utilization ratio of the node is lower than a third utilization ratio, wherein the processor, when executing the computer program, is further configured to:

determine a third power consumption for allocation, and allocate the third power consumption for allocation from the preset power consumption of the node with to-be-recycled power consumption to the reserved total power consumption, such that a power consumption utilization ratio of the node with to-be-recycled power consumption is equal to or greater than a fourth utilization ratio.

8. An allocation device for power consumption of an integral chassis, wherein the allocation device is applied to a chassis management controller (CMC) and comprises:

a memory, configured to store a computer program; and a processor, configured to implement, when executing the computer program, steps of the allocation method for power consumption of the integral chassis according to claim 1.

9. A non-transitory readable storage medium applied to a chassis management controller (CMC), wherein the readable storage medium stores a computer program which, when executed by a processor, implements steps of the allocation method for power consumption of the integral chassis according to claim 1.

* * * * *